(No Model.)

A. W. DUCK.
BICYCLE BRAKE.

No. 594,234. Patented Nov. 23, 1897.

Witnesses;
Lewis Wilson
Franklyn J. Rackliffe

Inventor;
Abram W. Duck.

UNITED STATES PATENT OFFICE.

ABRAM W. DUCK, OF OAKLAND, CALIFORNIA.

BICYCLE-BRAKE.

SPECIFICATION forming part of Letters Patent No. 594,234, dated November 23, 1897.

Application filed October 28, 1896. Serial No. 610,308. (No model.)

*To all whom it may concern:*

Be it known that I, ABRAM W. DUCK, a citizen of the United States, residing at Oakland, in the county of Alameda and State of California, have invented a new and useful Bicycle-Brake, of which the following is a specification.

My invention relates to improvements in bicycle-brakes in which a lever attached by a clamp to the stem of the handle-bars and operated by the thumbs of the rider, with the motion of the lever in the line of the length of the bicycle, is used in conjunction with a pair of rubber friction-rollers placed so as to grip each side of the tire of the front wheel of the bicycle; and the objects of my improvements are, first, to do away with the long clumsy brake-lever so common to all lever bicycle-brakes; second, to do away with the wear and tear on the bicycle-tire; third, to so arrange the brake-lever that it can be operated by either the right or the left hand, or by both hands, of the rider simultaneously; fourth, to be able to detach the brake from the bicycle in the shortest possible time; fifth, to arrange the friction-rollers so that when in contact with the tire they will revolve at the least touch and the harder they are pressed against the bicycle-tire the more power they will exert to stop the bicycle. I attain these objects by the mechanism illustrated in the accompanying drawings, in which—

Figure 1:
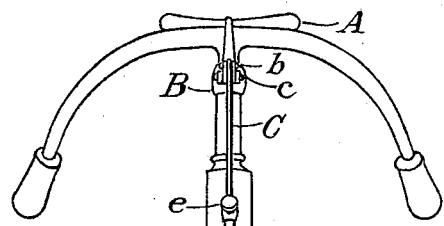
Figure 2:
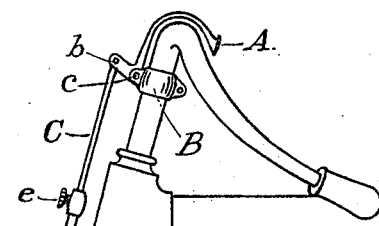
Figure 3:
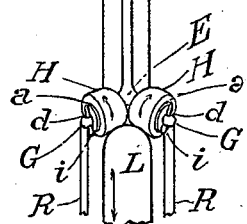
Figure 6:
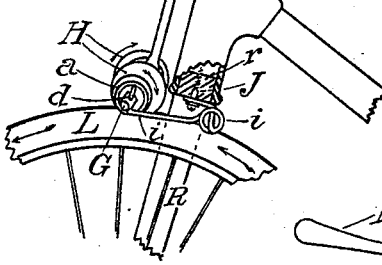
Figure 4:
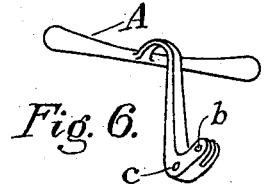
Figure 5:
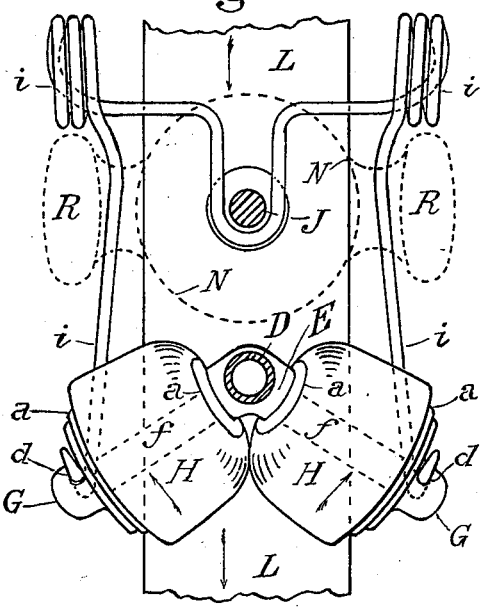
Figure 5:
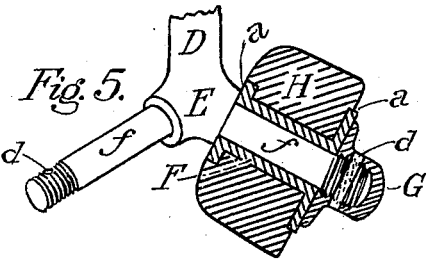

Figure 1 is a front view of the brake and lever attached to the bicycle. Fig. 2 is a side view of the brake and lever attached to the bicycle. Fig. 3 is a view of the releasing-spring and friction-rollers shown in plan, showing how the friction is transmitted from the tire through the medium of the rollers to friction-washers that sustain the wear and tear in place of the bicycle-tire. Fig. 4 is an end view of one of the friction-rollers and its parts. Fig. 5 is a view of the compound axle with one friction-roller shown in position. Fig. 6 is a perspective view of the brake-lever.

Similar letters refer to similar parts throughout the several views.

A refers to the brake-lever, and B to the clamp attached to the perpendicular stem of the handle-bars, said clamp forming the fulcrum of the brake-lever.

C D is the extension rod or plunger connecting brake-lever with the compound axle E.

$ff$ are the arms of the compound axle E, carrying the sleeve F and the threaded and flanged friction-washer G.

H is the friction-roller, made of rubber, metal, or wood, or any suitable material, preferably rubber, attached to sleeve F and held in position by flanges $a\,a$.

J is the screw holding the double-coil releasing-spring $ii$ in proper position to release the friction-rollers from the bicycle-tire.

L is the tire of the bicycle, with the friction-rollers H H shown in position.

N is the frame of the bicycle.

R R are the bicycle-forks.

$b$ is the bolt attaching the extension-rod to the brake-lever.

$c$ is the bolt connecting the brake-lever to the clamp.

$d$ is the hole passing through the end of the compound axle and also the flanged and threaded friction-washer to receive the ends of the double-coil releasing-spring, and by so arranging it it prevents the friction-washer from turning on the axle and coming off.

$e$ is the set-screw holding the parts of the extension-rod in position.

$r$ is a block to receive the screw J.

One of the principal features of my invention is the shape of the compound axle with the arms inclined downward to conform to the shape of the bicycle-tire and forward, so that the rollers when pressed against the bicycle-tire will have an outward pressure against the flange of the threaded friction-washer, which sustains the friction, in place of the bicycle-tire.

In Fig. 3 the arrows show the direction of motion of the tire and of the friction-rollers.

The lever A is curved so as to fit over the top of the handle-bar and has horizontal transverse extensions essentially parallel with and behind the handle-bar, which allows the rider to use either or both hands, pressing upon one or both the extensions, so as to force the brake-lever forward about its fulcrum in the line of travel of the machine instead of at right angles therewith.

The lower front end of the brake-lever is in the form of a bell-crank having the angle fulcrumed to the clamp, which is secured around the stem of the handle-bar.

The spring $i\ i$ has its ends turned upward and entering the friction-washer, as previously described. Thence the two parts of the spring extend rearwardly between the forks of the bicycle. Thence, turning transversely and essentially at right angles behind the forks, they are coiled as shown. Thence, returning inwardly toward the center and behind the bicycle-forks, this portion rests directly against the bicycle-forks. Thence the central curve extends between the forks, and the bight there formed serves to receive the washer and screw by which the spring is clamped in place.

This spring performs the triple duty, first, of forming an elastic support for the brake-rollers and the lower end of the plunger-rod serving to keep the rollers normally out of contact with the bicycle-tire; secondly, the transverse portion of the spring resting against the rear portion of the bicycle-forks prevents the rollers and plunger-rod from being forced forward by the friction on the tire, thus avoiding the use of any other clamp at this point, and, thirdly, they act as a lock to prevent the friction-washers exterior to the brake-rollers from being turned. The plunger-rod being thus supported by the spring at the lower end and by the lower projecting portion of the brake-lever at the upper end is maintained close to and parallel with the steering-head without the necessity of any other attachment.

The friction-rollers are made essentially cylindrical or of the same diameter from the outer ends toward the center, so that the portion which rests upon the tire is essentially cylindrical. The inner ends of these rollers are rounded or curved, as shown, so as to allow them to be brought close together, but the part which presses upon the tire is the cylindrical portion.

An important feature is the formation of the arms of the axle so that they incline not only downward toward the tire, but forward at an obtuse angle with each other and with the foot of the plunger-rod. This brings the cylindrical pressure portion of the rollers upon the tire at such an angle with its line of travel that the rollers turn at a corresponding angle with the line of movement of the tire, thus producing a compressing action upon the tire without a frictional rubbing or dragging at this point, which would cause the tire to be worn out in a short time. It also produces an outward pressure, which forces the outer ends of the rollers against the frictional washers, where all the friction takes place.

What I claim as my invention, and desire to secure by Letters Patent, is—

1. In a bicycle-brake, a plurality of rollers journaled upon shafts extending downwardly and forwardly at an obtuse angle with each other and means for forcing the rollers into contact with the tire.

2. In a bicycle-brake, a plunger-rod having shafts at its lower ends extending in opposite directions downwardly and forwardly at an obtuse angle, rollers on said shafts, frictional washers on the outer portions of the shafts to receive the outward pressure of the rollers and means for forcing the rollers in contact with the tire.

3. In a bicycle-brake and in combination with the brake-rod, an actuating bell-crank lever connected with the rod and having its free end curved over and behind the handle-bars so that the lever lies in the direction of the line of travel of the machine.

4. In a bicycle-brake, rollers journaled upon shafts extending downwardly and forwardly at an obtuse angle from their junction, a plunger-rod fixed to the junction of said shafts extending upwardly having its upper end connected with one arm of a bell-crank lever, the other arm of said lever extending upwardly and bent backwardly above the handle-bar of the machine and having transverse extensions, a clamp fixed to the stem and below the handle-bar, a fulcrum-pin upon which the angle of the bell-crank lever is turnable whereby the brake is applied by moving the lever in the line of travel of the machine.

5. In a bicycle-brake, a bell-crank lever having one arm curved above the handle-bar, horizontal extensions upon the rear end of this arm whereby either hand may be employed to operate the lever, a clamp fixed to the stem of the handle-bar and below the bar having a fulcrum-pin in its forward portion upon which the angle of the bell-crank lever is turnable, a plunger-rod having the upper end connected with the forwardly-projecting arm of the bell-crank brake-lever, and the lower end connected with shafts which diverge downwardly and forwardly from the point of junction, rollers mounted and turnable upon said shafts, said rollers having essentially cylindrical faces to contact with the tire upon each side of a central line, screw-threaded frictional washers adjustable upon the ends of the roller-shafts and against which the outer ends of the rollers abut, and a spring extending forwardly from the lower part of the steering-head engaging the washers and supporting the plunger-shaft, and the rollers normally out of contact with the tire.

6. In a bicycle-brake, a vertically-movable plunger-rod having its upper end connected with a bell-crank lever fulcrumed to move in line with the travel of the machine whereby the plunger-rod is depressed, shafts having the junction connected with the lower end of the plunger-rod and extending at an angle downwardly and forwardly from said junction, rollers journaled upon said shafts having the outer portion of their faces made cylindrical and the inner portion curved, screw-threaded washers fitting corresponding threads upon the outer ends of the roller-shafts whereby the frictional contact between said washers and the outer ends of the rollers is regulated, a spring secured between the forks at the lower end of the steering-post of the bicycle, serving to support the plunger-rod and the rollers normally out of contact with the bicycle-tire and having the forward ends adapted to enter perforations in the washers exterior to the rollers whereby the device is supported and the washers prevented from turning.

7. In a bicycle-brake, a vertically-movable plunger-rod having the upper end connected with a brake-lever fulcrumed to move in the line of travel of the machine, the lower end carrying downwardly and forwardly diverging shafts, rollers journaled upon said shafts and having cylindrical contact-surfaces to press upon the tire at each side of the central line, circular screw-threaded washers fitting and adjustable upon the ends of the shafts to form frictional contact with the outer ends of the rollers, a spring having its forward ends adapted to enter perforations in the washers, whereby the rollers are normally supported out of contact with the tire and the washers are prevented from turning, said spring extending rearwardly between the forks of the bicycle and bent transversely across behind said forks having a central portion, and means for securing it centrally within the fork-crown whereby said spring forms a yielding support to normally hold the rollers out of contact with the tire, a stop to prevent the rollers and plunger-rod from being moved forwardly when the brake is applied, and means for locking the frictional washers to prevent their rotation.

ABRAM W. DUCK.

Witnesses:
LEWIS WILSON,
FREDERICK G. WESTON.